(12) United States Patent
Goislot

(10) Patent No.: US 8,141,338 B2
(45) Date of Patent: Mar. 27, 2012

(54) DEVICE FOR INJECTING MONO-PROPELLANT AT A FLOW RATE THAT CAN BE MODULATED WITH AN INJECTION SPEED THAT IS STABLE

(75) Inventor: Hervé Goislot, Paris (FR)

(73) Assignee: SNECMA, Paris (FR)

( * ) Notice: Subject to any disclaimer, the term of this patent is extended or adjusted under 35 U.S.C. 154(b) by 470 days.

(21) Appl. No.: 12/500,059

(22) Filed: Jul. 9, 2009

(65) Prior Publication Data

US 2010/0006677 A1    Jan. 14, 2010

(30) Foreign Application Priority Data

Jul. 11, 2008    (FR) .................................... 08 54778

(51) Int. Cl.
*F02C 3/20*    (2006.01)
(52) U.S. Cl. ........................ 60/258; 60/39.462
(58) Field of Classification Search ............ 60/258, 60/257, 39.461, 39.01, 39.462, 740
See application file for complete search history.

(56) References Cited

U.S. PATENT DOCUMENTS

| | | | | |
|---|---|---|---|---|
| 2,810,259 | A | * | 10/1957 | Burdett, Jr. ................ 60/258 |
| 3,074,231 | A | | 1/1963 | Klein |
| 3,232,049 | A | * | 2/1966 | Rhodes .................... 60/258 |
| 3,742,701 | A | | 7/1973 | Feemster et al. |
| 3,897,008 | A | | 7/1975 | Dettling et al. |
| 4,782,660 | A | | 11/1988 | Domyan et al. |

* cited by examiner

*Primary Examiner* — Ehud Gartenberg
*Assistant Examiner* — Vikansha Dwivedi
(74) *Attorney, Agent, or Firm* — Weingarten, Schurgin, Gagnebin & Lebovici LLP

(57) ABSTRACT

The injector device for injecting a liquid mono-propellant with a large degree of flow rate modulation and an injection speed that is stable, and that is closable for extinction and re-ignition purposes, is disposed at an upstream end of the wall of a combustion chamber of a rocket engine. The device includes at least one feed channel for feeding mono-propellant from a tank, and first and second concentric annular speed-up channels connected to the feed channels and having outlets opening out respectively via first and second annular injection sections situated in a plane that is substantially perpendicular to the axis of the chamber. The first and second concentric annular channels are oriented to converge on each other with a resultant that lies substantially along the axis of the chamber, forming an angle that is predefined in such a manner as to output two sheets of injected liquid mono-propellant that mutually in an atomization ring at a predetermined distance from the upstream end forming the end wall of the combustion chamber and in the vicinity of the axis of the combustion chamber.

8 Claims, 1 Drawing Sheet

DEVICE FOR INJECTING MONO-PROPELLANT AT A FLOW RATE THAT CAN BE MODULATED WITH AN INJECTION SPEED THAT IS STABLE

FIELD OF THE INVENTION

The present invention relates to a device for injecting a liquid mono-propellant with a high degree of flow rate modulation and with an injection speed that is stable, the device being shuttable for extinction and re-ignition purposes, being disposed at an upstream end of the wall of a combustion chamber of a rocket engine, and including a feed channel for feeding mono-propellant from a tank.

PRIOR ART

Various liquid propellant injector devices for rocket engines are already known.

By way of example, FIG. 2 shows a "pintle" type device that makes it possible, for bi-propellant injection, to modulate the flow rate to a large extent as a result of the injection sections being varied by a movable part 34.

In the system of FIG. 2, an oxidizer is injected into the combustion chamber 30 through an annular orifice 32 between a movable part 34 and a stationary part 36 coaxially located therein. A fuel is also injected through an annular orifice 38 around the movable part 34, between the movable part and a portion of the wall of the combustion chamber 30. The fuel and the oxidizer diverge away from their respective outlet orifices and form jets that meet and mix in an annular combustion zone designated by reference 40.

Nevertheless, implementing two independent feed systems for a fuel and for an oxidizer makes fabrication rather complex and the device cannot be compact, in particular when it incorporates a shutter rod.

In prior art devices, the resultant of the two sheets is oriented so as to be directed towards the wall of the chamber.

In known injector devices of that type, mixing and combustion therefore tend to take place very close to the wall of the combustion chamber, thereby reducing its lifetime, or else giving rise to large chamber diameters, and it may also favor trickling along the wall. Furthermore, the large portion projecting into the chamber constitutes an element of weakness.

Patent documents U.S. Pat. No. 3,074,231 and U.S. Pat. No. 4,782,660 describe injectors for bi-propellants with an annular opening of variable section.

DEFINITION AND OBJECT OF THE INVENTION

The present invention seeks to remedy the above-mentioned drawbacks and to enable an injector device to be provided that is compact and suitable for injecting a mono-propellant that can be extinguished and re-ignited, the device presenting a design that is simplified and enabling the rate of injection to be modulated and also shut off, while increasing the lifetime of the combustion chamber, and reducing any risk of trickling on its wall.

In accordance with the invention, these objects are achieved by a device for injecting a liquid mono-propellant with a high degree of flow rate modulation and an injection speed that is stable, the device being closable for extinction and re-ignition purposes, being disposed at an upstream end of the wall of a combustion chamber of a rocket engine, and including at least one feed channel for feeding mono-propellant from a tank, wherein:

the device includes first and second concentric annular speed-up channels connected to the feed channels and having outlets opening out respectively via first and second annular injection sections that are situated in a plane that is substantially perpendicular to the axis of the chamber, the first and second concentric annular channels being oriented to converge towards each other with a resultant that lies substantially along the axis of the chamber, forming a predefined angle so as to output two sheets of injected liquid mono-propellant that impact against each other in an atomization ring at a predetermined distance from the upstream end forming the end wall of the combustion chamber and in the vicinity of the axis of the combustion chamber;

the first annular speed-up channel and the first annular injection section are defined firstly by a first wall forming a stationary surface of revolution situated level with said upstream end and secondly by a second wall forming a surface of revolution secured to a part that is movable in translation relative to said first wall forming a stationary surface of revolution;

the second annular speed-up channel and the second annular injection section are defined firstly by a third wall forming a stationary surface of revolution situated at the level of said upstream end and secondly by a fourth wall forming a surface of revolution secured to said part that is movable in translation relative to said first and third walls forming stationary surfaces of revolution; and the part that is movable in translation relative to the first and third walls forming stationary surfaces of revolution has a plurality of radial orifices to enable the second speed-up channel to be fed from a common feed channel that feeds the first speed-up channel directly.

The movable part includes a pilot section subjected to the effects of the fluid flow rate of the mono-propellant in the feed channel and acting against the action of a resilient element dimensioned to move the movable part into an open position when a predetermined force is exerted on the pilot section.

The resilient element may be constituted by a calibrated spring or by a set of spring washers.

The present invention relies on technology based on associating a system for modulating the flow rate of a mono-propellant with the mono-propellant being atomized by impact between two sheets having a resultant stemming from the orientations of the injection channels, which resultant lies substantially along the axis of the chamber, without any large projections being formed in the combustion chamber.

In a particular embodiment, the first and second walls form surfaces of revolution that are frustoconical with their small bases directed towards the combustion chamber.

Similarly, the third and fourth walls may form surfaces of revolution that are frustoconical with their large bases directed towards the combustion chamber.

In an advantageous embodiment, the mono-propellant feed holes are defined by a bell-shaped body having a bearing flange fastened by bolts on the upstream end of the combustion chamber wall, and a plurality of coaxial cylindrical guide walls for: guiding the movable part; positioning a central part for centering the third wall constituting a stationary surface of revolution; and providing sealing between said body and the movable part.

The device is designed in such a manner as to obtain regular injection sections over the entire perimeter and shutting that is almost perfect.

In a particular embodiment, the first wall constituting a stationary surface of revolution is defined by a portion in the form of a lip projecting from the upstream end of the combustion chamber wall, and the third wall constituting a stationary surface of revolution is defined by a portion in the form of a lip projecting from a stationary part fitted to said upstream end of the wall of the combustion chamber.

In general, for a mono-propellant, the invention enables the injection flow rate to be modulated using a small flow rate on ignition and subsequently a large amount of variation by having an injection section that is variable while enabling the speed of injection to be relatively stable.

Injection may be closed off completely in the injection plane when the mono-propellant flow rate is zero, thereby avoiding any combustion in the cavities of the injector, any combustion residues, or indeed any explosions, given the nature of certain propellants.

The system is mechanically simple and very compact, having only a single propellant feed channel.

The end wall of the combustion chamber is little exposed to significant recirculation because of the "axial" orientation, it does not have a projecting injector, which is particularly useful when a shutter rod is incorporated therewith.

Atomization takes place by the propellant being projected, with the resultant of the propellant injection axes being oriented close to the axis of the chamber, thereby avoiding potential trickling on the wall of the combustion chamber and rapid damage thereto as a result of combustion.

Furthermore, the injector device is easily adaptable and a central part for defining an injection section may easily be interchanged. In addition, an empty space at the center of the injector device makes it possible to incorporate a throat shutter or an ignitor, for example.

The device of the invention is applicable to any rocket engine with a high degree of thrust modulation and it also relates to such a rocket engine fitted with an injector device of the invention.

BRIEF DESCRIPTION OF THE DRAWING

Other characteristics and advantages of the present invention can be better understood on reading the following description of a particular embodiment, given by way of non-limiting indication and with reference to the drawing, in which.

DETAILED DESCRIPTION OF A PREFERRED EMBODIMENT

Figure 1:
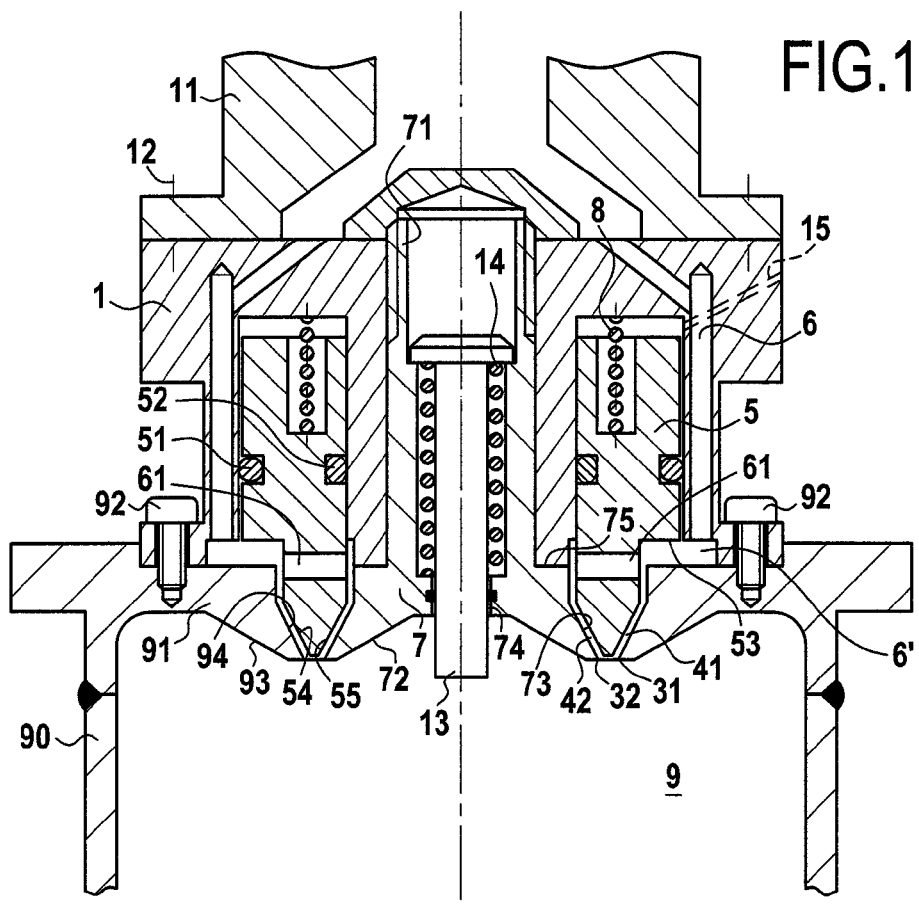
FIG. 1 is a diagrammatic axial section view of a mono-propellant injector device constituting a particular embodiment of the invention.
Figure 2:
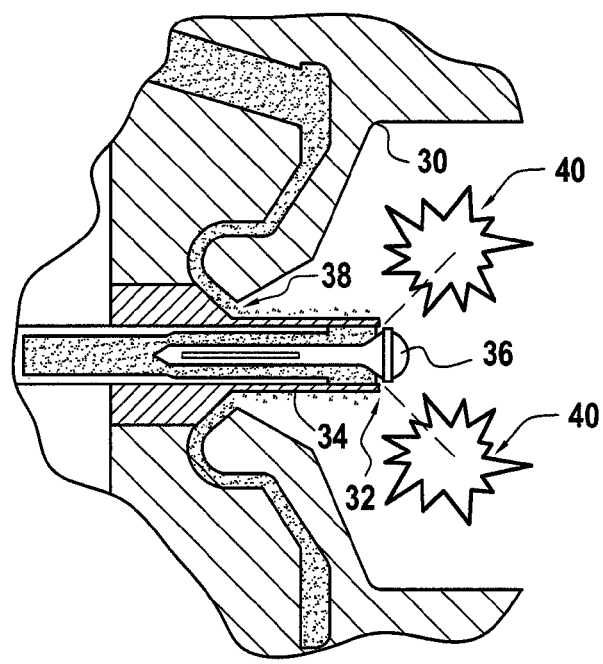
FIG. 2 is a diagrammatic axial section view of a prior art device for bi-propellant injection provided with a movable part for modulating the injection flow rate of a propellant.

With reference to FIG. 1, there can be seen a diagrammatic longitudinal section view of a mono-propellant injector device of the invention.

FIG. 1 shows part of a combustion chamber 9 defined by a wall 90 having an upstream end identified by reference 91.

A bell-shaped body 1 has a base in the form of a flange that is fastened to the end wall 91 by fastener elements 92 such as bolts. The body 1 defines liquid propellant feed holes that are in communication with a tank via a space defined by a second body 11 fastened by screws or bolts 12 to the bell-shaped body 1 and possibly comprising a plurality of parallel channels distributed around an annular zone of the body 1 and opening out into an annular space at the level of the end wall 91.

The chamber end wall 91 presents a projecting portion 93 in the form of a skirt or lip that is circularly symmetrical and defines a stationary surface of revolution 94 on the face looking towards the speed-up channel 41. The stationary surface of revolution 94 advantageously presents a shape that is frustoconical with its small base facing towards the inside of the combustion chamber 9.

The bell-shaped body 1 presents a central cavity in which a stationary central part 7 is inserted that may for example present a tubular portion 71 having a thread enabling it to be secured to the body 1. The central portion 7 may present a shoulder 75 that comes into abutment against the body 1 to position the central portion 7 accurately with its portion facing towards the chamber 9 having a projecting portion 72 in the form of a skirt or lip that is circularly symmetrical and that defines a stationary surface of revolution 73 on the base facing towards the speed-up channel 41. The stationary surface of revolution 73 advantageously presents a frustoconical shape with its large base directed towards the inside of the combustion chamber 9.

The inner and outer stationary projecting portions 72 and 93 form respective points at their free terminal ends that lie in a plane that is substantially perpendicular to the axis of the chamber.

A movable part 5 of annular shape is coaxial with the stationary central part 7 and with cylindrical tubular portions of the body 1.

The movable part 5 that is placed in an annular housing of the body 1 between two tubular portions of said body is guided to move in translation along the axis of the chamber 9.

Sealing gaskets 51 and 52 are disposed between firstly the movable part 5 and secondly the cylindrical walls of the tubular portions of the body 1.

The propellant feed holes 6 or the various parallel channels are formed through the outer tubular portion of the body 1.

Radial orifices 61 are formed in the movable part 5 to enable the mono-propellant to flow on both sides of the downstream portion of the movable part 5.

One face 53 of the movable part 5 defines a pilot section that is subjected to the variations in the flow rate of the propellant flowing in the annular portion of the feed channel 6, these flow rate variations varying substantially with pressure.

The rear face of the movable part 5 is subjected to the action of a resilient element such as a spring 8 that is interposed between the stationary body 1 and the movable part 5. A channel 15 serves to exhaust unwanted fluids to the outside during the upward movement of the movable part 5.

The front terminal portion of the movable part 5 facing towards the combustion chamber 9 presents two surfaces of revolution 54 and 55 that are advantageously frustoconical in shape.

The surface of revolution 54 constitutes an outer frustoconical surface with its small base directed towards the combustion chamber 9, while the surface of revolution 55 constitutes an inner frustoconical structure with its large base directed towards the combustion chamber 9 and it is situated, like the small base of the frustoconical structure 54, in a plane that is substantially perpendicular to the axis of the combustion chamber.

A first annular speed-up channel 41 connected directly to the feed channels 6 and having its outlet opening via a first annular injection section 31 is defined by the stationary surface of revolution 94 and by the movable surface of revolution 54.

In similar manner, a second annular speed-up channel 42 connected to the feed channels 6 via the orifices 61 and having its outlet opening out via a second annular injection section 32 is defined by the stationary surface of revolution 73 and by the movable surface of revolution 55.

The spring 8 is dimensioned so as to urge the movable part 5 into the position for closing the propellant injection sections 31 and 32 in the outlet plane of the injector when the flow rate of the mono-propellant is zero, and for causing the propellant injection sections 31 and 32 to open when the flow rate of the propellant acting on the pilot section 53 produces a predetermined effect on the spring 8.

The central part 7, which can be dismantled, confers modularity that enables the shape and the angle of inclination of the stationary inner surface of revolution 73 to be adapted.

At the outlets from the concentric speed-up channels 41 and 42 that are oriented in converging directions at a predefined angle, the mono-propellant ejected via the concentric outlet sections 31 and 32 is in the form of two sheets that impact against each other in an atomization ring that is at a predetermined distance from the upstream end 91 forming the end wall of the combustion chamber and that is in the vicinity of the axis of the combustion chamber.

Variation in flow rate, which itself varies substantially in proportion to pressure, has the effect on the pilot section 53 of controlling the movement in translation of the movable part 5, thereby giving rise to variation in the first and second annular injection sections 31 and 32.

The fluid flowing in the feed channel 6 feeds the first speed-up channel 41 and, via the orifices 61, the second speed-up channel 42, the first and second speed-up channels 41 and 42 forming a predefined angle so as to define two annular sheets of injected liquid propellant with high-quality impact between these two injected sheets giving rise to atomization at the impact.

The resultant of the first and second speed-up channels 41 and 42 is directed parallel to the axis of the combustion chamber 9 or even slightly towards the center of said chamber.

The two sheets impact in a ring at a distance from the end wall 91 of the chamber, with a resultant along the axis of the chamber and recirculation is limited.

The bell-shaped body 1 is machined in a single stage, in particular to confer thereon a central tubular portion that serves to position the centering central part 7 and to guide the part 5 that is movable in translation parallel to the axis of the chamber 9.

Given the statically-indeterminate nature of the system, good concentricity is guaranteed to ensure the following simultaneously:
  guidance of the movable part 5;
  sealing with the outer surface of the movable part 5;
  long centering of the part 7 for centering the inner lip 72 that contributes to defining the inner speed-up channel 42, in co-operation with the movable part 5; and
  short centering of the body 1 and plane bearing of the base flange of said body 1 on the end plate of the chamber 91 that, by means of its projecting portion 93, contributes to defining the outer speed-up channel 41, in co-operation with the movable part 5.

The facts of minimizing the number of parts that are stacked one on another and of machining long cylinders in a single stage serve to guarantee good operation.

Furthermore, the fact that the free end of the movable part 5 is relatively fine serves to minimize the effects of pressure in the chamber 9 on the spring 8, or on some equivalent resilient element such as a stack of spring washers.

FIG. 1 shows a central rod 13 that is axially movable under drive from a spring 14 and that can serve for example to control selective shutting of the throat of the combustion chamber 9. Under such circumstances, the centering part 7 that is inserted in the body 1 and that is secured thereto includes a portion 74 that provides first short guidance for the movable central rod 13 relative to the stationary body 1. Additional short guidance is provided in the combustion chamber so that long guidance is established in combination with the first short guidance.

At the center of the injector, instead of the shutter rod, it is possible to install an ignitor.

Naturally, various modifications and additions may be applied without going beyond the ambit of the present invention.

Thus, for example, the chamber end wall 91 and the side wall 90 of the chamber 9 may include a protective covering (not shown in FIG. 1).

The device is also suitable for being adapted to be controlled in force. Under such circumstances, the pilot section 53 and the spring 8 are omitted and the movable part 5 is coupled to an actuator, e.g. of mechanical, hydraulic, or electrical type, via a plurality of rods that pass through the body 1, in the bottom of a groove via a plurality of holes.

In the present description, and in conventional manner, a member is said to be for "short centering" when it defines a zone of contact that can be modelled as a sphere-cylinder contact.

If the length of the contact zone is L and if the diameter of the short centering member is D, then a relationship of the following type applies:

$$L \leq 0.8D$$

Preferably, it is possible to choose the value for the length L of the contact zone to lie within the following range of values:

$$0.1D \leq L \leq 0.5D$$

In more preferred manner, it is possible to select the value for the length L of the contact zone to lie in the following range of values:

$$0.1D \leq L \leq 0.3D$$

Furthermore, likewise in conventional manner, a member is said to be for "long centering" when it defines a contact zone that can be modelled as a pivoting-sliding contact.

If the length of the contact zone is L and if the diameter for the member for long centering is D, then a relationship of the following type applies:

$$D \leq L$$

Preferably, a value may be selected for the length L of the contact zone that lies in the following range of values:

$$1.5D \leq L$$

What is claimed is:

1. A device for injecting a liquid mono-propellant with a high degree of flow rate modulation and an injection speed that is stable, the device being closable for extinction and re-ignition purposes, being disposed at an upstream end of the wall of a combustion chamber of a rocket engine, and including at least one feed channel for feeding mono-propellant from a tank, wherein:
  the device includes first and second concentric annular speed-up channels connected to the feed channels and having outlets opening out respectively via first and second annular injection sections that are situated in a plane that is substantially perpendicular to the axis of the chamber, the first and second concentric annular channels being oriented to converge towards each other with a resultant that lies substantially along the axis of the chamber, forming a predefined angle so as to output two sheets of injected liquid mono-propellant that impact against each other in an atomization ring at a predetermined distance from the upstream end forming the end wall of the combustion chamber and in the vicinity of the axis of the combustion chamber;

the first annular speed-up channel and the first annular injection section are defined firstly by a first wall forming a stationary surface of revolution situated level with said upstream end and secondly by a second wall forming a surface of revolution secured to a part that is movable in translation relative to said first wall forming a stationary surface of revolution;

the second annular speed-up channel and the second annular injection section are defined firstly by a third wall forming a stationary surface of revolution situated at the level of said upstream end and secondly by a fourth wall forming a surface of revolution secured to said part that is movable in translation relative to said first and third walls forming stationary surfaces of revolution; and the part that is movable in translation relative to the first and third walls forming stationary surfaces of revolution has a plurality of radial orifices to enable the second speed-up channel to be fed from a common feed channel that feeds the first speed-up channel directly.

2. A device according to claim 1, wherein the movable part includes a pilot section subjected to the effects of the fluid flow rate of the mono-propellant in the feed channel and acting against the action of a resilient element dimensioned to move the movable part into an open position when a predetermined force is exerted on the pilot section.

3. A device according to claim 2, wherein the resilient element is constituted by a calibrated spring or by a set of spring washers.

4. A device according to claim 1, wherein the first and second walls form surfaces of revolution that are frustoconical with their small bases directed towards the combustion chamber.

5. A device according to claim 1, wherein the third and fourth walls form surfaces of revolution that are frustoconical with their large bases directed towards the combustion chamber.

6. A device according to claim 1, wherein the mono-propellant feed holes are defined by a bell-shaped body having a bearing flange fastened by bolts on the upstream end of the combustion chamber wall, and a plurality of coaxial cylindrical guide walls for: guiding the movable part; positioning a central part for centering the third wall constituting a stationary surface of revolution; and providing sealing between said body and the movable part.

7. A device according to claim 1, wherein the first wall constituting a stationary surface of revolution is defined by a portion in the form of a lip projecting from the upstream end of the combustion chamber wall, and the third wall constituting a stationary surface of revolution is defined by a portion in the form of a lip projecting from a stationary part fitted to said upstream end of the wall of the combustion chamber.

8. A device according to claim 1, wherein the movable part is coupled to an actuator via a plurality of rods passing through the body, in the bottom of the groove, via a plurality of holes.

* * * * *

UNITED STATES PATENT AND TRADEMARK OFFICE
CERTIFICATE OF CORRECTION

PATENT NO. : 8,141,338 B2
APPLICATION NO. : 12/500059
DATED : March 27, 2012
INVENTOR(S) : Herve Goislot It is certified that error appears in the above-identified patent and that said Letters Patent is hereby corrected as shown below:

In the Claims:

Column 6, line 51 through Column 8, line 31, please delete claims 1-8.

Claims 1-8 should read as follows:

-- 1. A device for injecting a liquid mono-propellant with a high degree of flow rate modulation and an injection speed that is stable, the device being closable for extinction and re-ignition purposes, being disposed at an upstream end of a chamber wall of a combustion chamber of a rocket engine, and including at least one feed channel for feeding mono-propellant from a tank, wherein:

the device includes first and second concentric annular speed-up channels connected to the at least one feed channel and having outlets opening out respectively via first and second annular injection sections that are situated in a plane that is substantially perpendicular to an axis of the chamber, the first and second concentric annular channels being oriented to converge towards each other with a resultant that lies substantially along the axis of the chamber, forming a predefined angle so as to output two sheets of injected liquid mono-propellant that impact against each other in an atomization ring at a predetermined distance from the upstream end of the chamber wall and in the vicinity of the axis of the combustion chamber;

the first annular speed-up channel and the first annular injection section are defined firstly by a first wall that is in the form of a stationary surface of revolution situated level with said upstream end and secondly by a second wall that is in the form of a surface of revolution secured to a movable part that is movable in translation relative to said first wall that is in the form of a stationary surface of revolution;

the second annular speed-up channel and the second annular injection section are defined firstly by a third wall that is in the form of a stationary surface of revolution situated at the level of Signed and Sealed this
Twenty-eighth Day of January, 2014

Michelle K. Lee
*Deputy Director of the United States Patent and Trademark Office* said upstream end and secondly by a fourth wall that is in the form of a surface of revolution secured to said movable part that is movable in translation relative to said first wall and movable in translation relative to said third wall; and the movable part that is movable in translation relative to the first and third walls that are in the form of stationary surfaces of revolution has a plurality of radial orifices to enable the second speed-up channel to be fed from a common feed channel that feeds the first speed-up channel.

2. A device according to claim 1, wherein the movable part includes a pilot section subjected to the effects of a fluid flow rate of the mono-propellant in the feed channel and acting against any action of a resilient element dimensioned to move the movable part into an open position when a predetermined force is exerted on the pilot section.

3. A device according to claim 2, wherein the resilient element is constituted by a calibrated spring or by a set of spring washers.

4. A device according to claim 1, wherein the first and second walls are frustoconical with their small bases directed towards the combustion chamber.

5. A device according to claim 1, wherein the third and fourth walls are frustoconical with their large bases directed towards the combustion chamber.

6. A device according to claim 1, wherein the mono-propellant feed channel has holes that are defined by a bell-shaped body having a bearing flange fastened by bolts on the upstream end of the combustion chamber wall, and a plurality of coaxial cylindrical guide walls for: guiding the movable part; positioning a central part for centering the third wall constituting a stationary surface of revolution; and providing sealing between said body and the movable part.

7. A device according to claim 1, wherein the first wall constituting a stationary surface of revolution is defined by a portion in the form of a lip projecting from the upstream end of the combustion chamber wall, and the third wall constituting a stationary surface of revolution is defined by a portion in the form of a lip projecting from a stationary part fitted to said upstream end of the chamber wall of the combustion chamber.

8. A device according to claim 1, wherein the movable part is coupled to an actuator via a plurality of rods passing through a body, in the bottom of the groove, via a plurality of holes. --